United States Patent [19]

Yomogizawa et al.

[11] Patent Number: 4,728,977
[45] Date of Patent: Mar. 1, 1988

[54] DEVICE FOR PROTECTING THE PHOTOGRAPHIC OPTICAL SYSTEM OF CAMERA

[75] Inventors: Shinya Yomogizawa; Kiyoshi Ikuta, both of Kanagawa, Japan

[73] Assignee: Canon Kabushiki Kaisha, Tokyo, Japan

[21] Appl. No.: 56,261

[22] Filed: May 26, 1987

Related U.S. Application Data

[63] Continuation of Ser. No. 884,762, Jul. 11, 1986, abandoned.

[30] Foreign Application Priority Data

Jul. 12, 1985 [JP] Japan .................................. 60-153751
Feb. 27, 1986 [JP] Japan .................................. 61-42284
Feb. 27, 1986 [JP] Japan .................................. 61-42285

[51] Int. Cl.$^4$ .......................... G03B 3/00; G03B 17/02; G03B 17/04
[52] U.S. Cl. .................... 354/187; 354/195.1; 354/202
[58] Field of Search ............... 354/187, 195.1, 195.12, 354/202, 288

[56] References Cited

U.S. PATENT DOCUMENTS

| | | | |
|---|---|---|---|
| 577,891 | 3/1897 | Turner | 354/187 |
| 3,611,896 | 10/1971 | Aoki | 354/202 |
| 3,938,170 | 2/1976 | Winkler et al. | 354/187 X |
| 4,303,328 | 12/1981 | Persson et al. | 354/288 |
| 4,365,884 | 12/1982 | Knapp | 354/187 |
| 4,597,657 | 7/1986 | Wakaboyashi | 354/187 X |

*Primary Examiner*—W. B. Perkey
*Attorney, Agent, or Firm*—Toren, McGeady & Associates

[57] ABSTRACT

This patent application discloses a device for protecting the photographic optical system of a camera having a first detector for detecting that the back cover of the camera is open or closed and a second detector for detecting whether or not the film is winding on the takeup spool, wherein when that the back cover is open or that the film is not winding on the spool is detected by the first and second detectors, either the rear of the photographic optical system is shut off, or the photographic optical system is moved forward, so that the rear vertex of the photographic optical system is prevented from being touched with a finger or the edge of the film leader.

36 Claims, 24 Drawing Figures

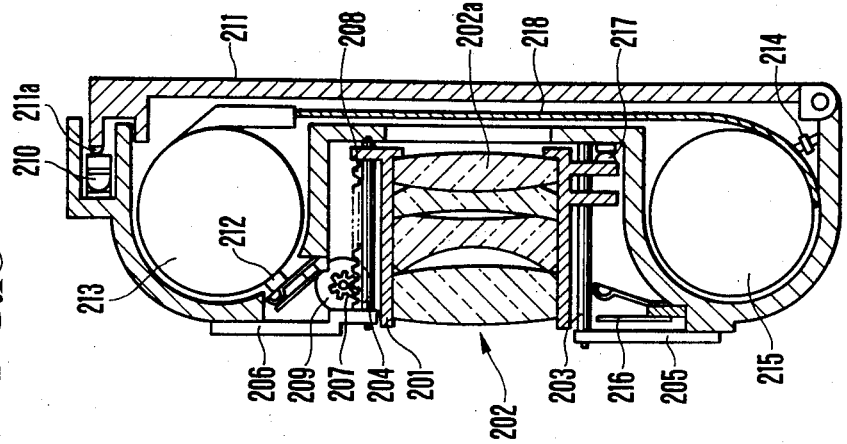
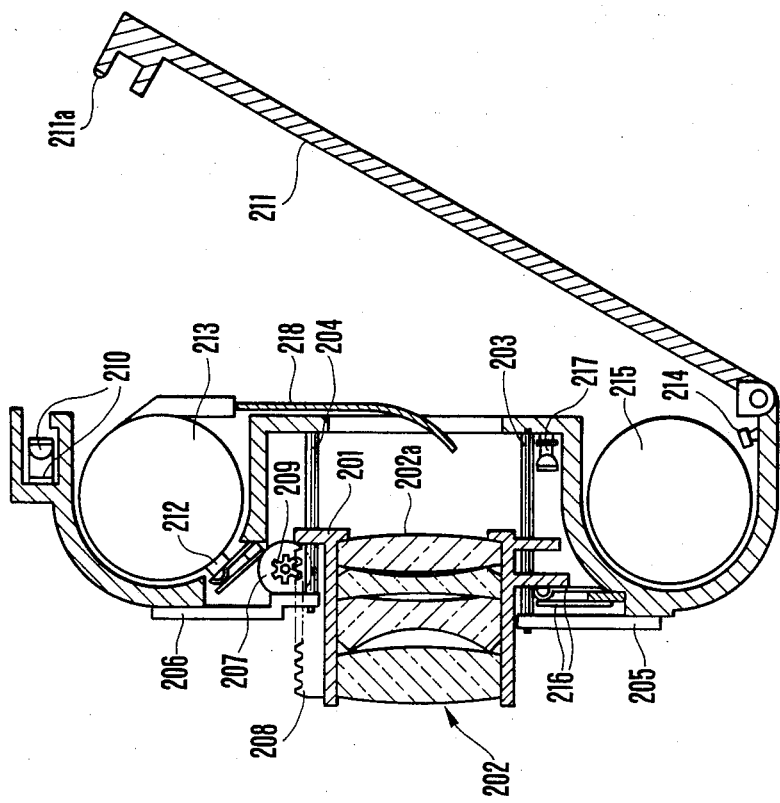

FIG.17

| | BACK COVER 211 | CARTRIDGE 213 | FILM SETTING | BARREL POSITION SELECTOR KNOB 219 |
|---|---|---|---|---|
| a | OPEN | PRESENT | IN CONVOLUTION | INOPERATIVE |
| b | OPEN | PRESENT | OUT OF CONVOLUTION | INOPERATIVE |
| c | OPEN | ABSENT | OUT OF CONVOLUTION | INOPERATIVE |
| d | CLOSED | PRESENT | IN CONVOLUTION | OPERATIVE |
| e | CLOSED | PRESENT | OUT OF CONVOLUTION | INOPERATIVE |
| f | CLOSED | ABSENT | OUT OF CONVOLUTION | OPERATIVE |

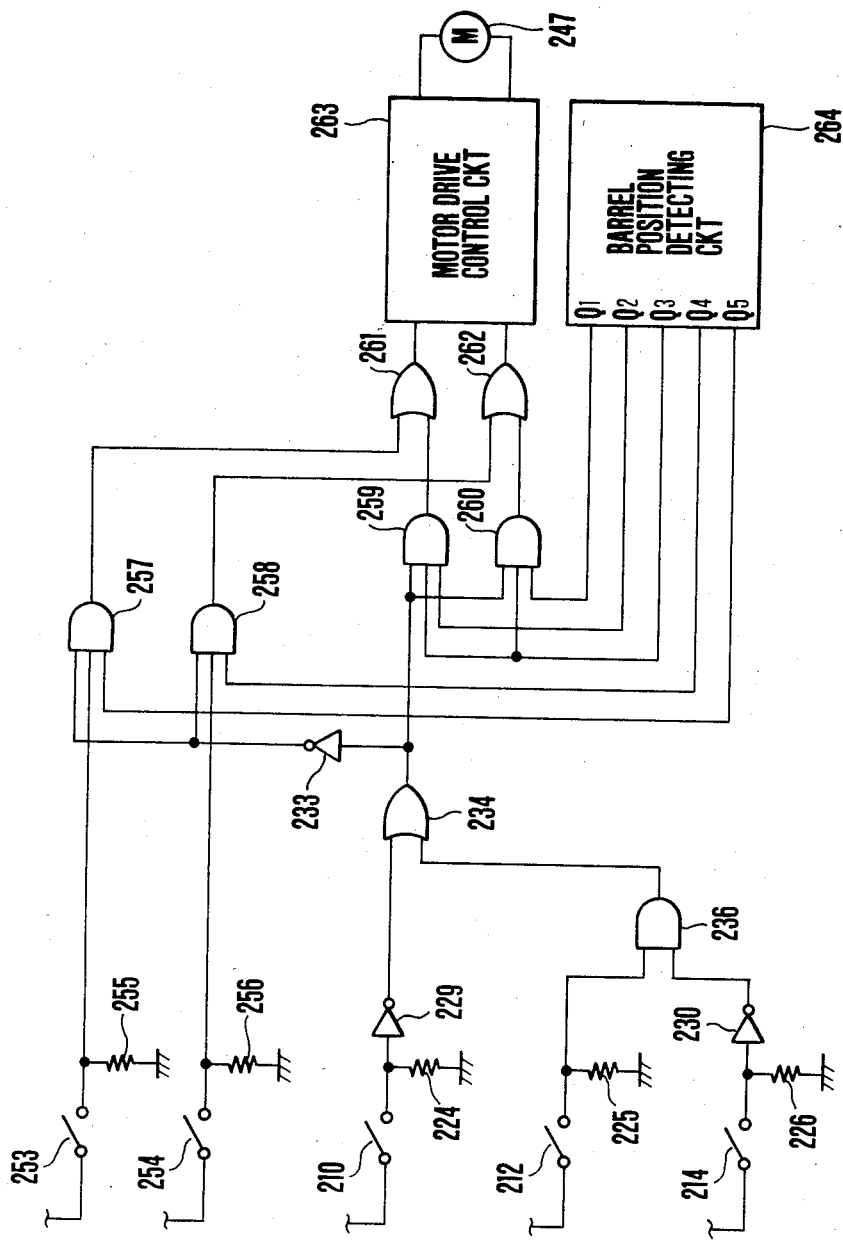
F I G. 18

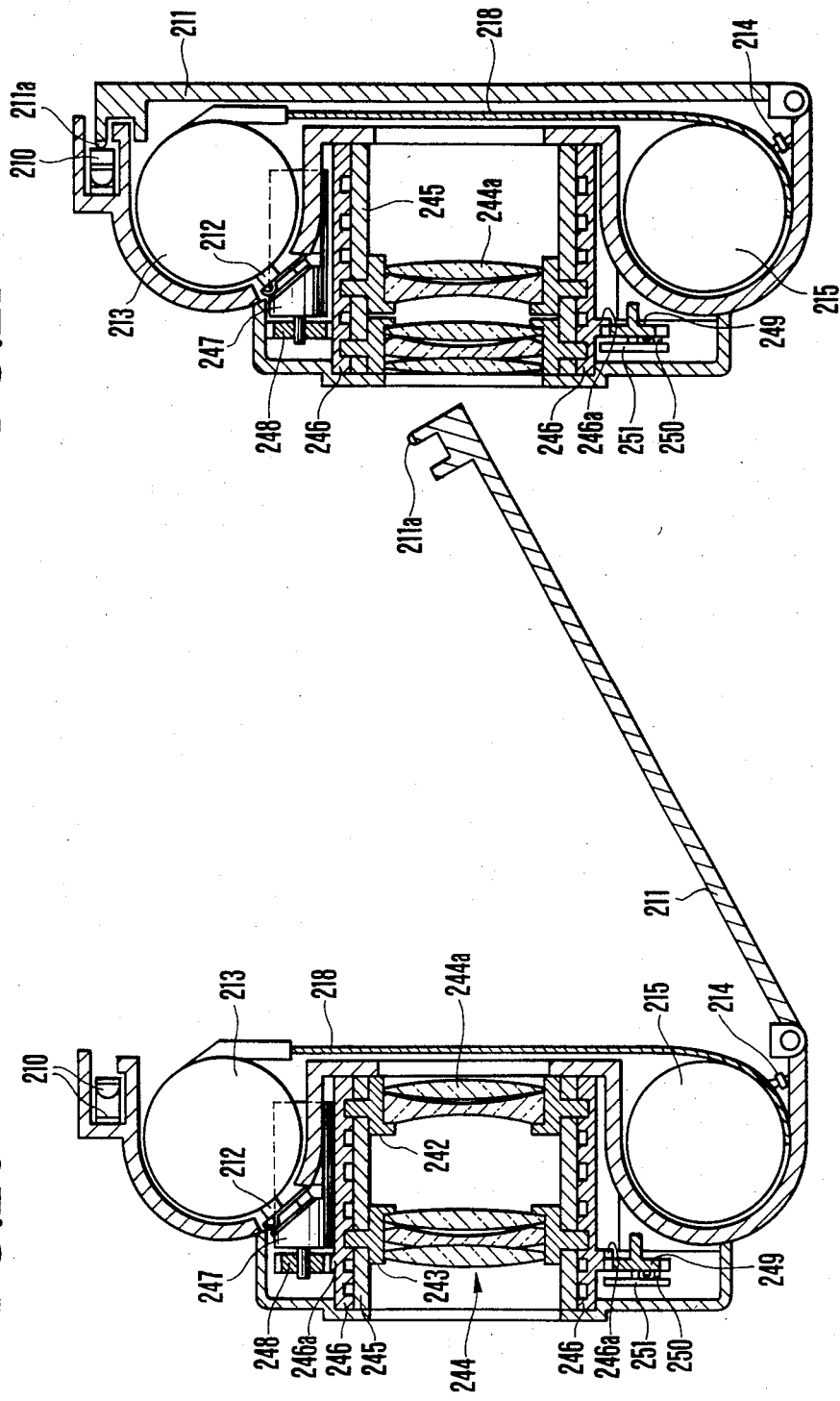

DEVICE FOR PROTECTING THE PHOTOGRAPHIC OPTICAL SYSTEM OF CAMERA

This is a continuation of appliation Ser. No. 884,762, filed July 11, 1986, now abandoned.

BACKGROUND OF THE INVENTION

1. Field of the Invention

This invention relates to photographic optical system protecting devices for cameras, and more particularly to photographic optical system protecting devices suited to cameras of the type in which the spacing between the back cover and the photographic lens is narrow.

2. Description of the Related Art

In the past, in the camera having such a collapsible barrel 19 as shown in FIG. 1, when collapsed (see FIG. 2), the rear vertex 20 of the photographic optical system came very near the back cover 21. In the camera in which the distance between the back cover and the photographic optical system was so much narrow, when the back cover 21 was opened, the possibility of damaging the rearmost lens element of the photographic optical system by a finger touching it was high. Also, as shown in FIG. 3, if the film leader Fa was in curl when the film was loaded, or the exposed film was rewound, a problem would arise that the edge of that film leader scratched the surface of the lens 20. The problems of this sort were not limited to the above-described collapsible barrel type camera, but found in the magnification changeable camera, and their frequency is increasing as the size of the camera is reduced. For example, in the recent lens shutter cameras where the back focal distance is very shortened in order to shorten the total length of the optical system, because the distance between the back cover and the photographic optical system is very narrow similarly to the above-described collapsible barrel type camera, there has been a very high possibility of damaging the lens when the back cover is open or when the film is loaded or rewound.

SUMMARY OF THE INVENTION

An object of the invention is to provide a device for protecting the photographic optical system of camera comprising a first detector for detecting whether or not the back cover is open, a second detector for detecting whether or not film is in convolution on the takeup spool, and means responsive to detection of either one of the conditions that the back cover is open and that the film leader is out of the spool by the first and second detectors for either shutting off the photographic optical system at the rear thereof, or moving the photographic optical system ahead, thereby the rear surface of the photographic optical system is protected as the rear surface is prevented from being scratched by the nail of a finger or the edge of the film leader touching thereon.

Other objects of the invention will become apparent from the following description of embodiments thereof.

BRIEF DESCRIPTION OF THE DRAWINGS

FIGS. 8 to 17 illustrate a second embodiment of the invention applied to the collapsible barrel type camera, with FIG. 8 being its electrical circuit diagram, FIGS. 9 and 10 being sectional views of the camera in the barrel-erected and barrel-collapsed positions respectively, FIGS. 11 and 12 being perspective views of the camera in the erected and collapsed positions respectively, FIGS. 13(a) and 13(b) being elevational views of the construction of the back cover sensor switch, FIG. 14 being a back elevational view of the camera with the back cover opened when the barrel is in the collapsed position, FIG. 15 being similar to FIG. 14 except that the film is when in rewind, FIG. 16 being similar to FIG. 15 except that the film rewinding is just before completion, and FIG. 17 being a table showing when a barrel setting knob becomes operable.

FIGS. 18 to 23 illustrate a third embodiment of the invention applied to the zoom lens-equipped camera with FIG. 18 being its electrical circuit diagram, FIG. 19 being an electrical circuit diagram of an example of the zooming position detector, FIGS. 20 and 21 being sectional views of the camera with the zoom lens in the wide angle and telephoto positions respectively, FIG. 22 being a perspective view of a pulse plate with a contact therefor, and FIG. 23 being a perspective view illustrating the outer appearance of the camera of FIGS. 20 and 21.

DETAILED DESCRIPTION OF THE PREFERRED EMBODIMENTS

Figure 1:
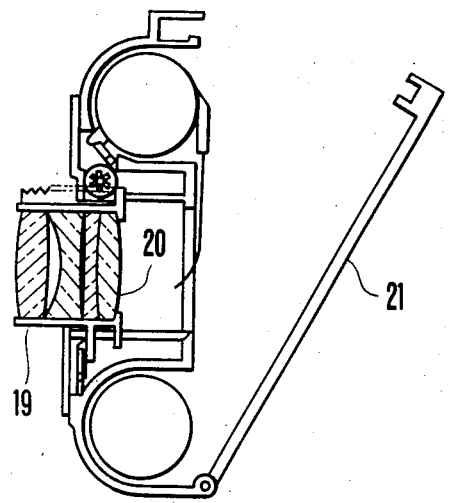
FIGS. 1 to 3 illustrate the conventional collapsible barrel type camera taken to explain the problems to be solved.
Figure 2:
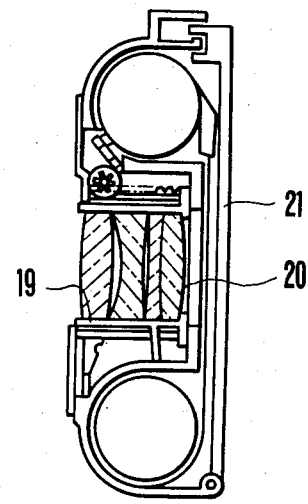
Figure 3:
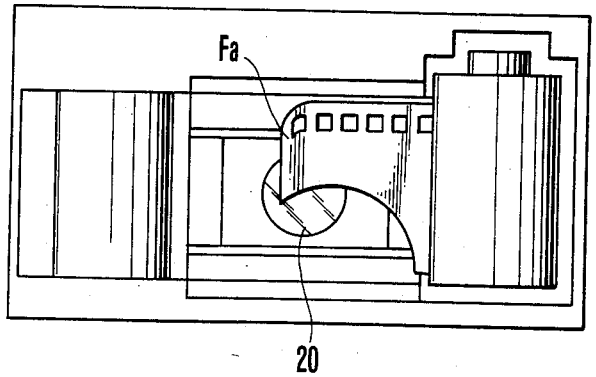
Figure 4:
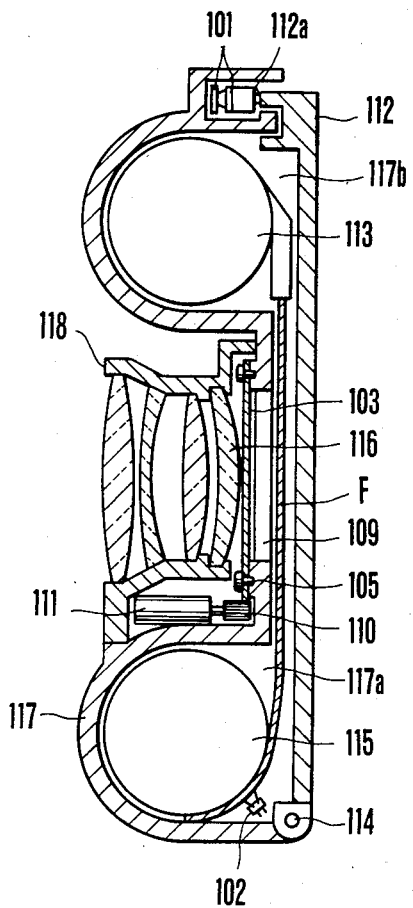
FIGS. 4 to 7 illustrate a first embodiment of the invention with FIG. 4 being a sectional view of a camera provided with a photographic optical system protecting device of the invention, FIGS. 5 and 6 being schematic views of the construction of the protecting device, and FIG. 7 being an electrical circuit diagram, partly in block form, of the control circuit for the motor of FIG. 4.

By reference to FIGS. 4 to 7, the first embodiment of the invention is described below. FIG. 4 is a sectional view of the main parts of the camera employing one form of the photographic optical system protecting device of the invention, and FIGS. 5 and 6 illustrate the outline of the main parts of the protecting device of the invention.

In FIG. 4, the camera 117 has a spool chamber 117a containing a takeup spool 115, and a cartridge chamber 117b for accommodating a film cartridge 113, and fixedly carries a barrel 118 containing a photographic lens. A back cover 112 is hinged to the camera body 117 by a pin 114. By this back cover 112, when closed, the interior of the camera body 117 is shielded against light. The free end of the back cover 112 is hooked by means (not shown) on the camera body 117. Positioned near this hooking means is a detector 101 constituting part of the photographic optical system protecting device of the invention. This detector 101 is constructed in the form of, for example, a normally open micro-switch and is arranged to be opened when an extension 112a on the free end of the back cover 112 pushes it as the back cover is closed. Another detector 102 is positioned within the spool chamber 117a and is capable of detecting by non-contact whether or not the film F is wound on the spool 115. This detector 102 is constructed with a photo-electric element, for example, photo-interrupter.

Figure 5:
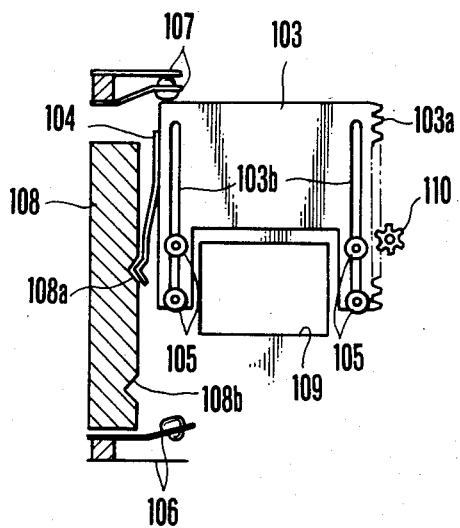
Figure 6:
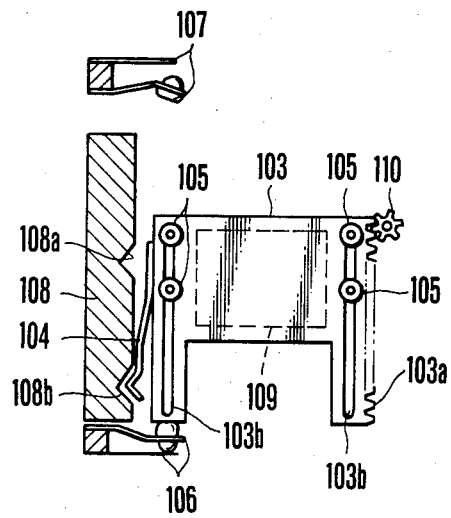

The photographic optical system has its rearmost lens 116 followed by a film gate 109 after a space in which a plate-shaped barrier 103 is arranged to be movable in a direction perpendicular to the paper as viewed in FIG. 4 (see also FIGS. 5 and 6). This barrier 103 has a rack 103a formed in the edge of one side thereof and is driven by a pinion 110 on the output shaft of a motor 111 to move vertically. The motor 111 is positioned adjacent the side of the barrel 118.

The barrier 103 has a pair of vertically elongated slots 103b parallel to each other in the vicinities of either side edge thereof and is guided in the vertical direction by pins 105 freely fitted in the slots 103b. The guide pins 105 are fixedly secured to the camera framework 117 at locations on either side of the film gate 109 as can be seen in FIGS. 5 and 6. A click leaf spring 104 is fixedly mounted to the opposite side edge of the barrier 103 and cooperates with detent recesses 108a and 108b in a click plate 108. When the lobe of the click leaf spring 104 is in engagement with the upper recess 108a as shown in FIG. 5, the barrier 103 is retracted from the position of the aperture 109. When in engagement with the lower recess 108b, the barrier 103 shields the aperture 109 as shown in FIG. 6.

Switches 106 and 107 are provided for detecting the position of the barrier 103 within the camera body 117. The switch 107 engages with the barrier 103 when it reaches its uppermost position (that is, when the barrier 103 fully retracts from the aperture 109), and the switch 106 engages with the barrier 103 when it reaches its lowermost position (that is, when the barrier 103 fully shuts out the aperture 109).

The back cover open-close detector 101, the film winding condition detector 102 and the switches 106 and 107 are incorporated in a control circuit for a motor 111 to be described later. The detectors 101 and 102 and the switches 106 and 107 work as follows:

(a) When the back cover 112 is closed as shown in FIG. 4, the detector 101 is OFF and when the film F convolutes on the spool 115, the detector 102 produces no output signal. In this condition (that is, the back cover 112 is closed and the film F convolutes on the spool 115), the barrier 103 takes the retracted position from the aperture 109 as shown in FIG. 5, the lobe of the click leaf spring 104 engages with the upper recess 108a of the click plate 108, and the barrier 103 engages with the upper switch 107. In such a manner, when the back cover 112 is closed and the film F convolutes on the spool 115, the barrier 103 is held in the position of FIG. 5, and, because of the barrier 103 and the switch 107 being in engagement with each other, the current supply to the motor 111 is cut off.

(b) When the back cover 112 has been opened, or when the detector 102 has detected that there is no film F on the spool 115, the control circuit for the motor 111 is operated by the back cover open-close detector 101 or the said detector 102 so that as a power supply control switch to the motor 111 is thrown, the motor 111 rotates. As a result, the barrier 103 is moved downward. When it reaches the position of FIG. 6, the lobe of the click leaf spring 104 engages with the lower recess 108b, applying a mechanical braking to the barrier 103. At the same time, the barrier 103 engages with the switch 106, thereby the current supply to the motor 111 is cut off. After that, the barrier 103 is held in the position of FIG. 6.

(c) When the barrier 103 lies in the position of FIG. 6 (that is, the paerture 109 is shut out by the barrier 103), while the back cover 112 is closed to turn off the first detector 101 and the convolution of the film F on the spool 115 is not detected, the current supply to the motor 111 is not initiated. In other words, when the barrier 103 lies in the position of FIG. 6, even if the back cover 112 is closed, the barrier 103 cannot move from the position of FIG. 6 to the position of FIG. 5 so long as the film F is not convoluted on the spool 115. Therefore, even if the back cover 112 is closed under the condition that the film leader Fa is not perfectly wound up on the spool 115, as in this state the barrier 103 shields the lens surface from the film gate, there is no possibility of damaging the surface of the lens 116 by the edge of the film leader Fa. Also when the film is being rewound, as soom as the film leader Fa moves away from the spool 115, the barrier 103 shuts off the lens 116, thus protecting the lens 116 from damage by the film leader Fa.

Therefore, according to the lens protecting device of the invention, the problem of damaging the nearest lens to the film plane by the finger or the film leader is completely removed.

Figure 7:
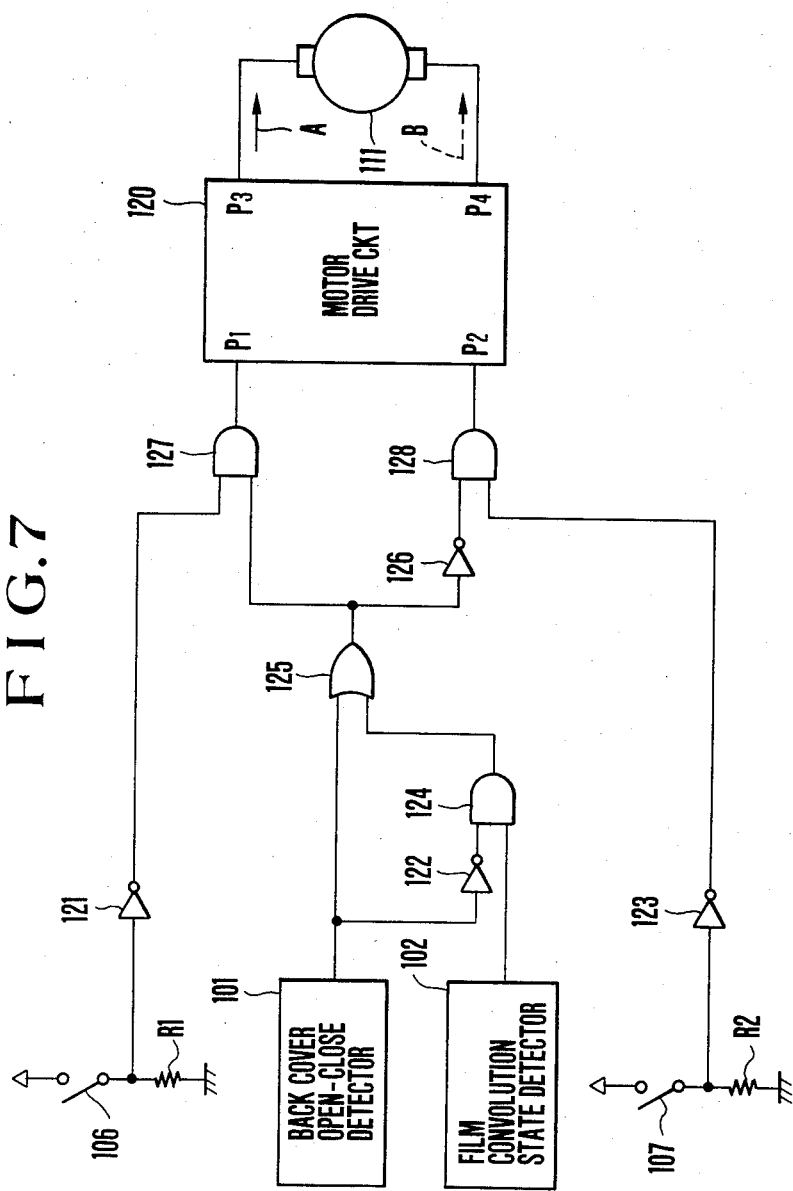

FIG. 7 shows an example of the control circuit for the motor 111. In FIG. 7, 120 is a motor drive circuit for supplying current for normal or reverse rotation of the motor 111. The motor drive circuit 120 responsive to an "H" (high level) signal applied on its input terminal P1 allows current of a direction of arrow A to flow from an output terminal P3 to the motor 111 causing the motor 111 to rotate in the normal direction (that is, the barrier 103 moves from the position of FIG. 5 to the position of FIG. 6). Alternatively, when the "H" signal is applied to another input terminal P2, current of direction of arrow B flows from another output terminal P4 to the motor 111, causing the motor 111 to rotate in the reverse direction (that is, the barrier 103 moves from the position of FIG. 6 to the position of FIG. 5).

For note, in FIG. 7, R1 and R2 are pullup resistors connected in series to the switches 106 and 107 (see FIGS. 5 and 6) respectively, and 101 is the back cover open-close detector and 102 is the film convolution detector.

The operation of the control circuit of FIG. 7 is next described in connection with the above-described situations (a), (b) and (c).

(A) In the case of the situation (a) where the back cover 112 is closed and the film is wound on the spool 115, the output of the back cover open-close detector 101 (hereinafter abbreviated to sensor 101) has "L" (low) level, and the output signal of the film convolution detector 102 (hereinafter abbreviated to sensor 102) also has "L" level. When the barrier 103 is in the retracted position from the aperture 109 as shown in FIG. 5, the barrier 103 and the switch 107 engage with each other so that in FIG. 7 the switch 107 is ON and the switch 106 is OFF. Since the output of the sensor 101 is "L", an inverter 122 produces an output of "H". But because the output of the sensor 102 is "L", the output of an AND gate 124 takes "L". Also, the output of an OR gate 125 becomes "L". Meanwhile, since the switch 106 is OFF, an inverter 121 produces an output of "H". But, because the output of the OR gate 125 is "L", the output of an AND gate 127 takes "L". As a result, the level of the input signal applied to the input terminal P1 of the motor drive circuit 120 is set in "L". For this reason, no current of direction of arrow A is supplied from the output terminal P3 of the motor drive circuit 120 to the motor 111.

On the other hand, since the output of the OR gate 125, an inverter 126 produces an output of "H". But because the switch 107 is ON, the output of an inverter 123 is "L", and the output of an AND gate 128, therefore, becomes "1". As a result, the input signal applied to the input terminal P2 of the motor drive circuit 120 also is set in "L". Therefore, no current of direction of arrow B is supplied from the output terminal P4 of the motor drive circuit 120 to the motor 111.

In short, when the back cover 112 is closed, the film also is wound on the spool 115, and the barrier 103 lies in the retracted position of FIG. 5 from the aperture 109, the motor 111 is not supplied with current for rotating it in either of the normal and reverse directions, being held standstill. The barrier 103 also is held in the position of FIG. 5.

Meanwhile, suppose that when the back cover 112 is closed and the film is wound on the spool 115, the barrier 103 lies in the aperture 109 shut out position as shown in FIG. 6. Then, the output of the sensor 101 becomes "L", the output of the sensor 102 "L", the output of the inverter 122 "H", the output of the AND gate 124 "L", the output of the OR gate 125 "L", the output of the AND gate 127 "L", and the output of the inverter 126 "H". Since, at this time, the barrier 103 and the switch 107 do not engage with each other, the output of the inverter 123 becomes "H", and the output of the AND gate 128 "H". So, the signal of "H" enters the P2 terminal. As a result, current of direction of arrow B flows to the motor 111 and the barrier 103 starts to rise from the position of FIG. 6. Soon after the start of upward movement of the barrier 103, the switch 106 opens, causing the output of the inverter 121 to change to "H". But, because the outputs of the sensors 101 and 102 do not change, the output of the OR gate 125 is left unchanged. Therefore, the output of the AND gate 127 remains "L".

When the barrier 103 reaches the retracted position of FIG. 5 from the aperture 109, the switch 107 turns on, thereby the output of the inverter 123 is changed to "L". Therefore, the output of the AND gate 128 also becomes "L", thereby the current of direction of arrow B is cut off from the motor 111. Thus, the motor 111 is stopped.

After that, the outputs of the sensors 101 and 102 do not change, and the switch 106 remains OFF. So the output of the OR gate 125 also remains "L". Because the output of the AND gate 127 also is "L", the current of direction of arrow A also does not flow to the motor 111. Therefore the barrier 103 is held in the position of FIG. 5, and the similar state to that described above takes place.

(B) In the case of the situation (b) where, while the barrier 103 lies in the retracted position of FIG. 5 from the aperture 109, that is, in the final stage of the above-described situation (a), the back cover 112 is opened or the film moves away from the spool 115.

First explanation is given to a situation that the back cover 112 is opened.

When the back cover 112 opens, the output of the sensor 101 becomes "H". Responsive to this, the output of the inverter 122 changes to "L". Since the output of the sensor 102 remains "L" (the film is wound on the spool 115), the output of the AND gate 124 is "L". But because the output of the OR gate 125 changes to "H", one of the inputs of the AND gate 127 changes to "H". Since, at this time, the switch 106 is OFF as shown in FIG. 5 as has been described above, the output of the inverter 121 is "H". Such change of the output of the OR gate 125 to "H" causes change of the output of the AND gate 127 to "H". Because of this, the signal of "H" enters the input terminal P1 of the motor drive circuit 120, and current of direction of arrow A is supplied to the motor 111 from the output terminal P3. As a result, the motor 111 rotates in such a direction that the barrier 103 moves downward from the position of FIG. 5.

When the barrier 103 starts to move downward from the position of FIG. 5, the switch 107 immediately turns off, thereby the output of the inverter 123 is changed from "L" to "H". Since, as this time, as has been described above, the output of the OR gate 125 is "H", and the output of the inverter 126 is "L", despite the output of the inverter 123 has changed to "H", the two inputs to the AND gate 128 do not both become "H". So, the level of the input signal at the input terminal P2 of the motor drive circuit 120 remains "L". Therefore, the current of direction of arrow B does not flow from the motor drive circuit 120 to the motor 111.

Also, the levels of the outputs of the sensors 101 and 102 do not change, and the switch 106 also is held OFF, so that the direction of flow of current from the motor drive circuit 120 to the motor 111 is held to that of arrow A.

Therefore, the barrier 103 continues moving down, finally reaching the position where the barrier 103 engages with the switch 106 to cut off the current supply to the motor 111.

That is, in FIG. 7, when the switch 106 turns on, the output of the inverter 121 changes from "H" to "L". Responsive to this, the AND gate 127 changes its output to "L". Therefore, the current of direction A is no longer supplied from the motor drive circuit 120 to the motor 111, and the rotation of the motor 111 stops. Since at this time the state of the switch 107 and the states of the outputs of the sensors 101 and 102 do not change, the output of the inverter 126 also remains "L". Therefore, since the output of the AND gate 128 also is held "L", the motor 111 is not supplied with the current of arrow B direction also.

Thus, when the back cover 112 has been opened, the barrier 103 automatically moves down from the position of FIG. 5 to the position of FIG. 6, entering the aperture 109 to shut off the rearmost lens 116. After that, it is staying as it is.

Next explanation is given to a situation that in the state of the above-described (b), the film leader slips out of the spool 115, or the film has been rewound into the cartridge.

When the film leader slips out of the spool or moves away therefrom as it is being rewound, while the back cover 112 is closed and the barrier 103 lies in the position of FIG. 5, it results that the output of the sensor 101 is "L", the output of the sensor 102 "H", the output of the inverter 122 "H", the output of the AND gate 124 "H", the output of the OR gate 125 "H". Also, since the switch 106 is OFF, and the switch 107 is ON, the output of the inverter 121 is "H", and the output of the inverter 123 is "L". Therefore, the output of the AND gate 127 becomes "H", and the output of the AND gate 128 becomes "L". So the signal of "H" enters the input terminal P1, causing the motor drive circuit 127 to supply current of direction of arrow A to the motor 111. As a result, similarly to the former, the barrier 103 starts to move down from the position of FIG. 5. Soon after the start of the downward movement of the barrier 103, the switch 107 and the barrier 103 disengage from each other, thereby the switch 107 is turned off. Responsive to this, the inverter 123 changes its output from "L" to "H". But, because the output states of the sensors 101 and 102 do not change, the output of the OR gate 125 also does not change. Therefore, the output of the AND gate 128 remains "L". This permits the barrier 103 to continue moving downward.

As the barrier 103 reaches the position of FIG. 6, when the switch 106 turns on, similarly to the above, the output of the inverter 121 becomes "L" and the output of the AND gate 127 becomes "L". So the current of direction of arrow A is no longer supplied to the motor 111, and the motor 111 stops. Since at this time the state of the switch 107 and the output of the sensors 101 and 102 do not change, the output of the AND gate 128 is left unchanged from "L". Therefore, after the barrier 103 has stopped in the position of FIG. 6, no current is supplied to the motor 111, and similarly to the case that the back cover 112 has opened, such state as it is held.

For note, in case the back cover 112 is opened and the film has slipped out of the spool 115 also, it is needless to say that the barrier 103 retracts from the aperture 109 as in the above, taking the position of FIG. 5.

(C) In the case of the situation (c), (in case the barrier 103 lying in the aperture 109 shut out position or the final stage of the above-described (b) is to retract from the aperture 109).

As has been shown in the above-described (B), when the back cover 112 opens or the film slips out of the spool 115, the barrier 103 remains in the position of FIG. 5 where the aperture 109 is shut out.

Therefore, according to the operation explained in the above-described (a), only when the back cover 112 is closed and the film leader is taken up on the spool 115, the barrier 103 retracts from the aperture 109, taking the position of FIG. 6.

As in the above, in the camera equipped with the device of the invention, when the film is not convoluted on the spool, or when the back cover is opened, the barrier 103 automatically advances into the space between the rearmost lens 116 in the photographic optical system and the film plane to shield off the rear surface of the rearmost lens 116. Therefore, there is no possibility that the curled portion of the film leader or the finger touches directly on the rearmost lens and accidents of damaging the lens 16 can be prevented from occurring beforehand.

FIGS. 8 to 17 illustrates a second embodiment of the invention applied to the collapsible barrel camera. In FIGS. 9 to 13, a lens barrel 202 contains a photographic lens group 201 as the photographic optical system and is supported by a bar 203. 204 is a key bar for restraining the lens barrel 201 from swinging about the support bar 203. 205 is a support bar mount; 206 is a key bar mount; 207 is a motor for axially moving the lens barrel 201. A pinion 209 is fixedly mounted to the output shaft of the motor 207 and meshes with a rack 208 provided on the side of the lens barrel 201. A switch 210 for detecting whether the back cover 211 is open or closed is constructed with such contacts, a and b, as shown in FIGS. 13(a) and 13(b) and an insulating member c between the contacts, a and b. When the back cover 211 is closed, its projection 211a pushes the contact, a, thereby the switch 210 is turned on (FIG. 13(a)). A cartridge detector or switch 212 of similar construction to that of the back cover detecting switch 210 and is arranged to turn on when the cartridge 213 is loaded in the cartridge chamber. A film convolution detecting switch 214 such as a photo-coupler itself projects light onto the film and receives its reflection or not depending on whether the film has been convoluted on a spool 215. A projection end detecting switch 216 turns on when the lens barrel 201 is in the projection end (positioned in the most forward moved position as shown in FIG. 9). A collapsing end detecting switch 217 turns on when the lens barrel 201 is in the collapsing end (when positioned with the nearest lens 202a of the photographic lens unit 202 to the film 218 being in the approaching state to the film plane 218 as shown in FIG. 10). A barrel position selector lever 219 when slid upward, causes the lens barrel 201 to project (see FIG. 11) and when slid downward, it collapses (see FIG. 12). Though not shown, there is provided a click stop mechanism for preventing the lens barrel 201 from unintentionally moving in the projected and collapsed positions.

Figure 8:
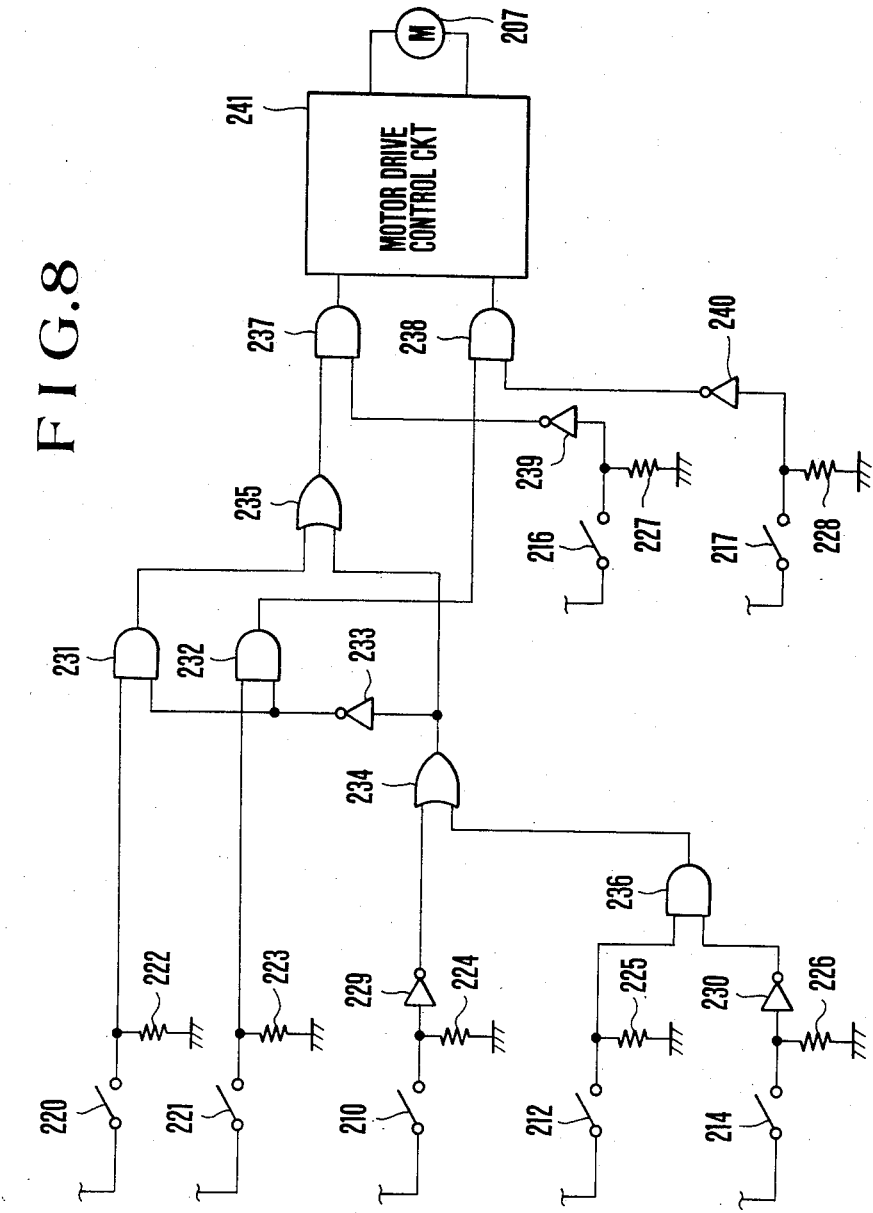
Figure 13A:
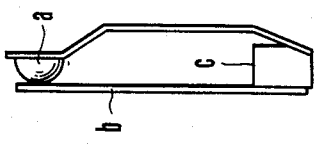
Figure 13B:
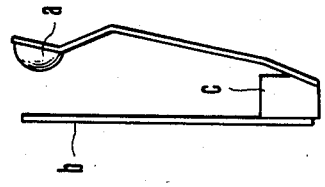

In FIG. 8, a switch 220 is arranged to turn on when the barrel position selector knob 219 is set in the upper position for projecting the barrel. Another switch 221 is arranged to turn on when the knob 219 is set in the lower position for collapsing the barrel. Pulldown resistors 222 to 228 are connected to respective switches. An inverter 229 produces an output signal of low level when the back cover detector or switch 210 turns on. When the film convolution detector or switch 214 turns on, another inverter 230 produces an output signal of low level. The circuit of FIG. 8 also includes AND gates 231 and 232, an inverter 233, OR gates 234 and 235 and AND gates 236, 237 and 238. When the projection end detecting switch 216 turns on, an inverter 239 produces an output signal of low level. When the collapsing end detecting switch 217 turns on, an inverter 240 produces an output of low level. A motor drive control circuit 241 controls the driving of the motor 207 in such a way that during the time when the output of the AND gate 237 is high level, the barrel 201 moves toward the projection end, while during the time when the output of the AND gate 238 is high level, the lens barrel 201 moves toward the collapsing end.

Figure 11:
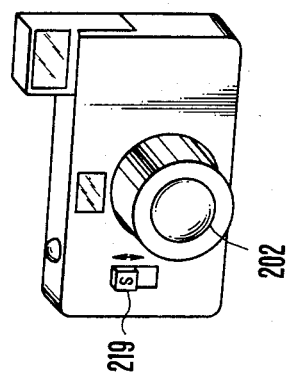

Next explanation is given to the operation. At first, the normal photographic state is explained. In this case, the back cover 211 is closed, and the film 218 is wound on the spool 215. So, the back cover detecting switch 210, the cartridge detecting switch 212 and the film convolusion detecting switch 214 are all turned on. Therefore, the output of the OR gate 234 becomes low level, and the output of the inverter 233 becomes high level. In this state, when the barrel position selector knob 219 is slid upward by the operator, the proejction side selecting switch 220 is turned on, causing the potential at the junction between it and the pulldown resistor 222 to become high level. Therefore, the output of the AND gate 231 becomes high level. Thereby, the output of the OR gate 235 also becomes high level. If the lens barrel 201 is not positioned in the projection end, or if the protection end detecting switch 216 is not closed and the output of the inverter 239 is not low level, the output of the AND gate 237 also becomes high level. By the motor drive control circuit 241 in the next stage, the driving of the motor 207 is controlled so that the lens barrel 201 moves toward the projection end. When the lens barrel 201 reaches the projection end, the projection end detecting switch 216 turns on, inverting the output of the inverter 239 to low level. Therefore, the output of the AND gate 237 also inverts to low level, stopping the movement of the lens barrel 201. This state is shown in FIG. 11.

Figure 12:
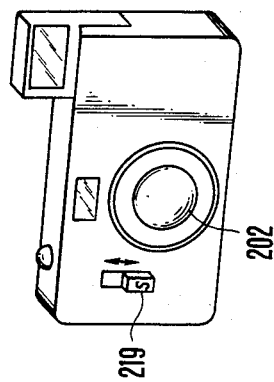

Conversely when the barrel position selector knob 219 is slid down, the collapsing side selection switch 221 is turned on, causing the potential at its conjunction with the pulldown resistor 223 to become high level and therefore causing the output of the AND gate 232 to become high level. If, at this time the lens barrel 201 is not positioned in the collapsing end, or if the collapsing side detecting switch 217 is not turned on and the output of the inverter 240 is not low level, the output of the AND gate 238 also becomes high level. Therefore, by the motor drive control circuit 241, the driving of the motor 207 is controlled so that the lens barrel 201 moves toward the collapsing end. When the lens barrel 201 reaches the collapsing end, the collapsing end detecting switch 217 is turned on, inverting the output of the inverter 240 to low level. Therefore the output of the AND gate 238 also inverts to low level, stopping the movement of the lens barrel 201. This state is shown in FIGS. 10 and 12.

The foregoing is the same as when the back cover 211 is closed and the cartridge 213 is not loaded in the camera. That is, in case the camera is usually carried about, or stored, the back cover 211 and others have such state. That the lens barrel 201 is collapsed in such state is the advantage of the collapsible barrel type camera.

Next we explain about either the state that the back cover 211 is open, or the state that the back cover is closed, and the cartridge 213 exits, but the film 218 is not wound on the spool 215. In such cases, at least one of the outputs of the inverter 229 and the AND gate 236 becomes high level. Therefore, the output of the inverter 233 becomes low level, and it never occurs that the outputs of the AND gates 231 and 232 become high level. That is, the operation of the barrel position selecting knob 219 is ignored. Meanwhile, the change of the output of the OR gate 234 causes the output of the OR gate 235 also to become high level. If, at this time, the barrel 201 is not positioned in the projection end, the output of the AND gate 237 also becomes high level as has been described above. Therefore, the driving of the motor 207 is controlled by the motor drive circuit 241 until the lens barrel 201 moves to the projection end.

Figure 14:
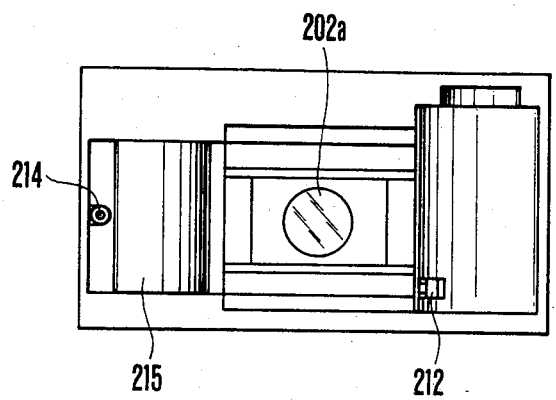
Figure 15:
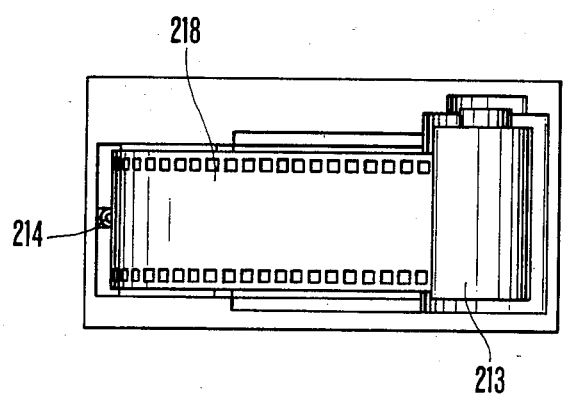
Figure 16:
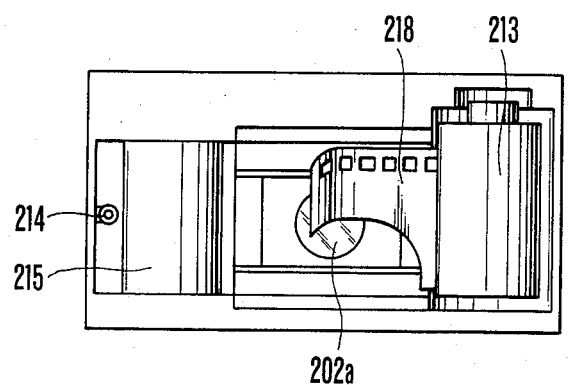

In short, this implies that though, in the past, there was a high possibility of making scratches in the lens 202a by carelessly touching it as the lens barrel 201 is collapsed as in FIG. 14 when the back cover 211 is opened and the film is being loaded, or by rubbing the lens 202a with the curled portion of the leader of the film 218 from the initiation of the rewinding to just before the termination of the rewinding (or at the time of start of auto-loading) as shown in FIGS. 15 and 16, such a drawback is removed in such a way that in such cases the result of selecting operation of the barrel position selecting knob 219 is rejected, that is, even if the collapsing side is selected by the barrel position selecting knob 219, the ON signal of the collapsing side selecting switch 221 which turns on in response thereto is not accepted, and the lens barrel 201 is forcibly moved until the projected end. For note, in FIGS. 15 and 16, the back cover 211 is not depicted so as to understand the state of the film 218.

The results of the above various states are summarized in FIG. 17. Here, what becomes somewhat a problem is a case of the state e of FIG. 17. In such a state, is included the case that the back cover 211 is being closed with the cartridge 213 whose all frames have been exposed being left loaded in the camera. Of course, if the projection of the lens barrel 201 is considered to be inconvenient to carry about, the cartridge 213 may be taken out of the interior of the camera so that the lens barrel 201 becomes collapsible (because of the state f). But, if this is avoided because of the troublesome of such operation, a film switch may be provided as arranged near the corresponding position to the mouth of the cartridge 213 between the cartridge chamber and the aperture to turn on when the film 218 is fully pulled in the cartridge 213, and to turn off when otherwise. In the time of such a state as e, therefore, the on-off state of that switch is detected. When that switch is on, the operation result of the barrel position selecting knob 219 is accepted. When off, the operation result of the barrel position selecting knob 219 is not accepted. The use of such an arrangement enables the above-described measure to be taken. If it is made as such, in all cases necessary to collapse the barrel, the user can freely collapse the barrel by operating the barrel position selecting knob 219. Also in all cases where there is a danger to damage the lens 202a, the lens barrel 201 projects automatically.

FIGS. 18 to 23 illustrate a third embodiment of the invention applied to a camera having the zoom function as an example of the magnification changeable optical system. The same parts as those of FIGS. 8 and 9 are denoted by the same symbols. In FIGS. 20 to 23, lens cells 242 and 243 contain respective lens units 244 constituting a photographic optical system. A body tube 245 slidably holds the lens cells 242 and 243. A cam sleeve 246 has a geared portion 246a on the outer periphery thereof to mesh with the pinion 248 fixedly mounted to the output shaft of the motor 247. When the motor 247 rotates, its output is transmitted to the cam sleeve 246, so that zooming is effected in a manner known in the art. A gear 249 meshes with the geared portion 246a of the cam sleeve 246, and has a contact 250 on the upper surface thereof. A pulse plate 251 is arranged above the gear 249 and its shaft is fixedly mounted to the camera body by a method (not shown). The pulse plate 251 has a pattern 251a connected to a battery voltage +VL of a logic circuit, and corresponding patterns 251b to 251f to the tele end, an interval between the tele end and a stop position, the stop position, another interval between the stop position and the wide end, and the wide end on the front surface, and has, on the back surface, patterns 251a' to 251f' for connection with lead wires electrically conducted to the respective patterns 251a to 251f through respective throughholes (not shown) (see FIG. 22). The contact 250 is arranged to contact with the pattern 251a and one of the patterns 251b to 251f at a time. Also, because the pattern 251a' or 251a is connected to the battery voltage +VL of the logic circuit as has been described above, as the gear 249 rotates with zooming, when the contact 250 connects the pattern 251a to one of the patterns 251b to 251f, a high level signal is produced from the conjunction of it and the corresponding one of resistors R1 to R5 shown in FIG. 19. This signal is used as the position signal of the lens unit 244. 252 is a tele-wide selector button for selecting either one of the tele and wide sides. (see FIG. 23).

Figure 19:
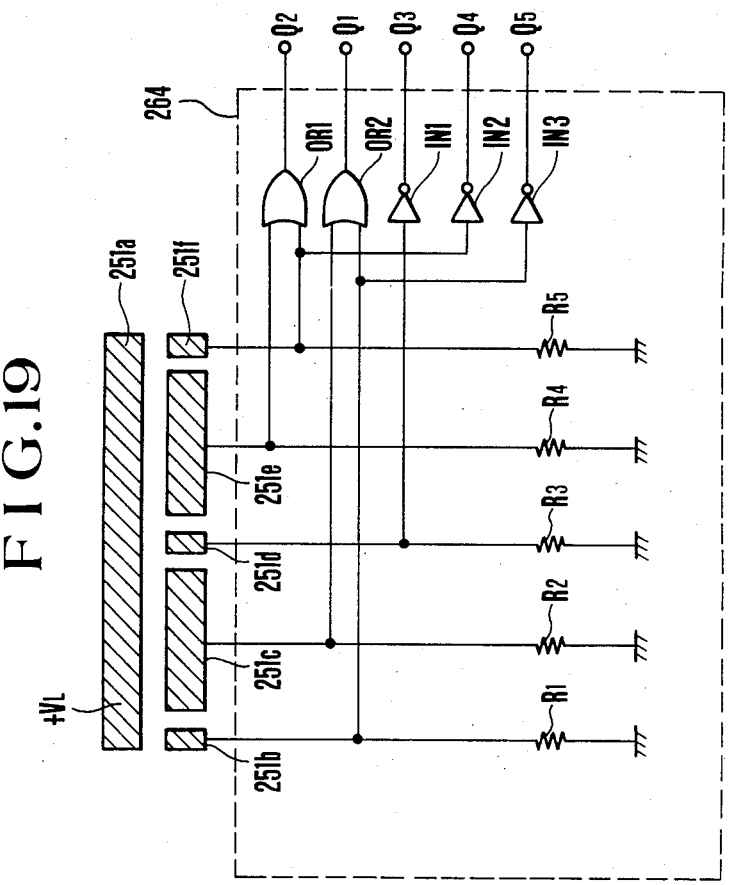
Figure 22:
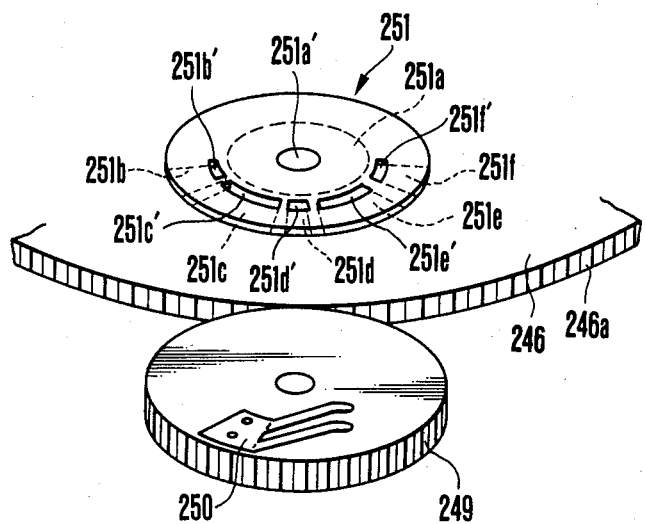
Figure 23:
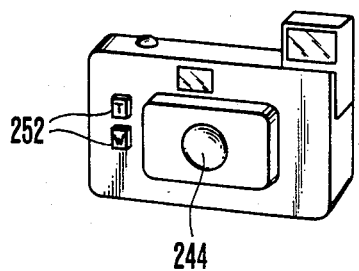

In FIG. 18, a switch 253 is arranged to turn on when the tele-wide selector button 252 is set in the tele side. Another switch 254 is arranged to turn on when the wide side is selected by the tele-wide selector button 252. Pullup resistors 255 and 256 are connected to the switches 253 and 254 respectively. 257 to 260 are 3-input AND gates. 261 and 262 are OR gates. A motor drive control circuit 263 controls the driving of a motor 247 in such a manner that during the time when the output of the OR gate 261 is high level, the photographic lens unit 244 moves toward the tele end, while during the time when the OR gate 262 is high level, the photographic lens unit 244 moves toward the wide side. A barrel position detecting circuit 264 is constructed, as shown in FIG. 19, for example, with inverters IN1-IN3, OR gates OR1 and OR2 and pulldown resistors R1-R5. When the photographic lens unit 244 is positioned in the tele end, the output of an output terminal Q5 becomes low level; when in the stop position, the output of another output terminal Q3 becomes low level, and when in the wide end, the output of another output terminal Q4 becomes low level. When it lies in the interval between the tele end and the stop position, the output of another output terminal Q1 becomes high level, and when in the interval between the wide end and the stop position, the output of another output terminal Q2 becomes high level.

Next, the operation is explained. For note, in this embodiment, it is assumed that the invention is applied to the camera having such a zoom mechanism that the stop position is farthest from the film plane 218, and the wide end is nearest to the film plane 218 (for example, there is another zoom type in which the tele end is nearest to the film plane 218). At first, the normal photographing condition is described. In this case, the back cover 211 is closed, and the film 218 is steadily taken up on the spool 215 so that the back cover detecting switch 210, the cartridge detecting switch 212 and the film convolution detecting switch 214 are all turned on. Therefore, the output of the OR gate 234 becomes low level, and the output of the inverter 233 becomes high level. In this state, when the operator selects zooming toward the tele side (by operating the tele-wide selecting button 252), the tele side selecting switch 253 turns on, thereby the junction with the pull down resistor 255 is changed to high level. If, at this time, the photographic lens unit 244 is not positioned in the tele end, because the output of the output terminal Q5 of the barrel position detecting circuit 264 is high level, the output of the AND gate 257 becomes high level. Thereby the output of the OR gate 261 also becomes high level. Therefore, the next stage or the motor drive control circuit 263 drives the motor 247 to rotate in such a direction that the photographic lens unit 244 (the lens cells 242 and 243) moves toward the tele end. That is, zooming toward the tele side starts. When the photographic lens unit 244 reaches the tele end, the contact 250 connects the pattern 251b to the pattern 251a of the pulse plate 251, thereby the output of the output terminal Q5 of the barrel position detecting circuit 264 is changed from high level to the low level. Therefore, the AND gate 257 and OR gate 261 change their outputs to low level. Thus, the zooming to the tele side terminates. This state is shown in FIG. 21.

Conversely when a zooming to the wide side is selected by operating the tele-wide selecting button 252, the wide side selecting switch 254 turns on, thereby its conjunction with the pull down resistor 256 is changed to high level. If, at this time, the photographic lens unit 244 is not positioned in the wide end, the output of the output terminal Q4 of the barrel position detecting circuit 264 is high level. Therefore, the output of the AND gate 258 becomes high level. Thereby the output of the OR gate 262 also becomes high level. Therefore, by the motor drive control circuit 263, the driving of the motor 247 is controlled so that the photographic lens unit 244 moves to the wide end. That is, a zooming toward the wide side is started. When the photographic lens unit 244 reaches the wide end, the pattern 251a and the pattern 251f of the pulse plate 251 are rendered conducting, causing the output of the output terminal Q4 of the barrel position detecting circuit 264 to invert from the high level to the low level. Therefore, the outputs of the AND gate 258 and OR gate 265 also invert to low level. Thus, the zooming to the wide side terminates. In FIG. 20, the state with the back cover 211 closed represents this state. The foregoing is the same even when the back cover 211 is closed but the cartridge 213 is not loaded in the camera.

Next, we explain about either a case where the back cover 211 is open, or a case where the back cover 211 is closed, and there is the cartridge 213, but the film 218 is not pulled up to the spool 215. Since, in such cases, at least one of the outputs of the inverter 229 and the AND gate 236 is high level, because the output of the inverter 233 becomes low level, it does not occur that the outputs of the AND gates 257 and 258 become high level. That is, the operation of the tele-wide selecting button 252 is ignored. If, at this time, the photographic lens unit 244 does not lie in the stop position and if it lies on the tele side of said stop position, or in such a position that the contact 250 connects the pattern 251a to the pattern 251b or 251c, the outputs of the output terminals Q1 and Q3 of the barrel position detecting circuit 264 both are high level. Therefore, the output of the OR gate 234 becomes high level which in turn causes the outputs of the AND gate 260 and the OR gate 262 to become high level. Therefore, the motor 247 is energized by the motor drive control circuit 263 until the photographic lens unit 244 reaches the stop position, or the output of the output terminal Q3 inverts to low level.

Meanwhile, if the photographic lens unit 244 lies on the wide side of the stop position, or the contact 250 connects the pattern 251a to the pattern 251e or 251f, the outputs of the output terminals Q2 and Q3 of the barrel position detecting circuit 264 both are high level. Therefore, the output of the OR gate 234 becomes high level, causing the outputs of the AND gate 259 and OR gate 261 also to become high level. The driving of the motor 247 is controlled by the motor drive control circuit 263 until the photographic lens unit 244 reaches the stop position, or, as has been described above, the output of the output terminal Q3 inverts to low level.

In short, though, in the past, there was a possibility that with the photographic lens unit 244 positioned in the wide side, when the back cover 211 was opened in order to load film, the operator unintentionally touched the lens 244a in the cell 242 by his finger, or the edge of the curled portion of the leader of the film 218 rubbed the lens 244a just before the rewinding terminated (or the auto-loading started) so that each damaged that lens 244a, such a drawback is removed in such a way that is such cases, the result of the selecting operation of the tele-wide selecting button 252 has no effect, that is, even if the wide side has been selected by the tele-wide selecting button 252, the photographic lens unit 244 is forcibly moved until the prescribed stop position.

According to the embodiments of FIGS. 8 to 23, when it has been detected that the cartridge 213 is present, and the film 218 is not convoluted on the spool 215, the indicating signals based on the operations of the barrel position selecting knob 219 and the tele-wide selecting button 252 are made unaccepted at all, and the lens barrel 201, 242, 243 (photographic lens unit 202, 244) is made to immediately move away from the near of the film plane 218, with an advantage that the danger of damaging the lens 202a, 244a by the edge of the curled portion of the leader of the film 218 can be removed. Also, when the opening of the back cover 211 has been detected, a similar measure to that described above is taken with an advantage that the danger of contaminating the rearmost lens 202a, 244a by finger prints of the user can even be removed. This results in that when applied to the camera having the zoom function, particularly in the lens shutter camera, the employment of such an optical system that when in the side position of zooming, the lens 244a comes extremely close to the film plane 218 becomes possible. This enables the total length of the optical system or the barrel to be shortened. Therefore, the invention can make a large contribution to an advance in the compactness of that camera. Also when applied to the collapsible barrel camera, such advantages as described above can be added without causing any loss in the performance the said camera intrinsically has, or the performance that the barrel can be collapsed to the compact form when in carrying about or in storage. Thus, the invention provides a very significant assurance on the maintenance of the quality of that camera.

As has been described above, according to the present invention, there are provided a first detector for detecting whether or not the back cover is open, a second detector for detecting whether or not the film is wound on the spool, and protecting means responsive to detection of either one of the conditions that the back cover is open and that the film is not wound on the spool by the first and second detectors for shutting off the rear of the photographic optical system or moving the photographic optical system ahead so that the surface of the rear portion of the photographic optical system is protected from the finger print, scratches by the edge of the free end of the film as it curls, and other damages. This advantage can be said to be great.

What is claimed is:

1. A photographic optical system protecting device for a camera comprising:
   (A) a photographic optical system;
   (B) protecting means for protecting a surface of a rear portion of said photographic optical system; and
   (C) control means responsive to opening of a cover for the purpose of loading photographic material or not setting of the photographic material to the photographic preparation completion state for actuating said protecting means.

2. A device according to claim 1, wherein said protecting means includes a projecting member for opening and closing, a portion in front of the surface of the rear portion of said photographic optical system.

3. A device according to claim 1, wherein said protecting means includes drive means for moving the surface of the rear portion of said photographic optical system away from said cover.

4. A device according to claim 1, wherein said control means includes detecting means for detecting that said protecting means has completed a prescribed operation.

5. A device according to claim 1, wherein said control means includes discriminating means for discriminating between the open and closed states of said cover.

6. A device according to claim 1, wherein said control means includes convolution discriminating means for discriminating between the convoluted and not-convoluted states of said photographic material on the spool.

7. A device according to claim 6, wherein said control means includes:
   (A) loading discriminating means for discriminating the loading state of said photographic material in the camera; and
   (B) gate means for actuating said protecting means in response to detection of the fact that said photographic material has been loaded in the camera by said loading discriminating means, and to detection of the fact that said photographic material is not wound on the spool by said convolution discriminating means.

8. A photographic optical system protecting device for a camera comprising:
   (A) a photographic optical system,
   said photographic optical system having its rear portion surface made displaceable;
   (B) drive means for displacing said photographic optical system;
   (C) control means for producing a control signal for controlling said drive means in such a manner that a surface of a rear portion of said photographic optical system is moved farther away from a cover in response to either opening of a cover for the purpose of loading a photographic material, or to detection of the fact that said photographic material is not set in a photographic preparation completion state; and
   (D) operating means for making said optical system arbitrarily displaceable when said control signal is not produced from said control means.

9. A device according to claim 8, wherein said photographic optical system includes a collapsible barrel optical system.

10. A device according to claim 8, wherein said photographic optical system includes a changeable magnification optical system.

11. A device according to claim 8, wherein said control means includes detecting means for detecting that said photographic optical system has displaced to a prescribed position, whereby said detecting means is responsive to displacement of said photogrphic optical system to said prescribed position for stopping the operation of said drive means.

12. A device according to claim 8, wherein said control means includes discriminating means for discriminating between the open and closed states of said cover.

13. A device according to claim 8, wherein said control means includes convolution discriminating means for discriminating between the convoluted and not-convoluted states of said photographic material on the spool.

14. A device according to claim 13, wherein said control means includes:
   (A) loading discriminating means for discriminating the loading state of said photographic material in the camera; and
   (B) gate means responsive to detection of the fact that said photographic material is loaded in the camera by said loading discriminating means and to detection of the fact that said photographic material is not wound on a spool by said convolution discriminating means for producing said control signal.

15. An optical system protecting device for a camera comprising:

(A) protecting means for protecting a surface of a rear portion of said optical system; and (B) control means responsive to opening of a cover for the purpose of loading photographic material or not setting of the photographic material to the photographic preparation complete state for actuating said protecting means.

16. A device according to claim 15, wherein said projecting means includes a protecting member for opening and closing a portion in front of the surface of the rear portion of said optical system.

17. A device according to claim 15, wherein said protecting means includes drive means for moving the surface of the rear portion of said optical system farther away from said cover.

18. A device according to claim 15, wherein said control means includes detecting means for detecting that said protecting means has completed a prescribed operation.

19. A device according to claim 15, wherein said control means includes discriminating means for discriminating between the open and closed states of said cover.

20. A device according to claim 15, wherein said control means includes convolution discriminating means for discriminating between the convoluted and not-convoluted states of said photographic material on the spool.

21. A device according to claim 20, wherein said control means includes:

(A) loading discriminating means for discriminating the loading state of said photographic material in the camera; and (B) gate means for actuating said protecting means in response to detection of the fact that said photographic material has been loaded in the camera by said loading discriminating means, and to detection of the fact that said photographic material is not wound on the spool by said convolution discriminating means.

22. A photographing optical system protecting device for a camera comprising:

(A) protecting means for protecting a portion of said photographing optical system which is exposed within the camera; and (B) control means for actuating said protecting means in response to an opening of a cover for loading photographic material or to a state in which the photographic material is not set at a prescribed photographic preparation completion state.

23. A device according to claim 22, wherein said protecting means includes cover means to covering said portion of the photographic optical system exposed within the camera so that said portion of the photographic optical system exposed within the camrea is protected.

24. A device according to claim 22, wherein said protecting means includes driving means for moving said portion of the photographic optical system exposed within the camera away from said cover or photographic material so that said portion of the photographic optical system exposed within the camera is protected.

25. A device according to claim 22, wherein said contorl means includes convolution discriminating means for discriminating whether said photographic material has been set at said prescribed photographic preparation completion state or not by discriminating a state of said photographic material being wound on a spool.

26. A device according to claim 25, wherein said control means further includes:

(A) loading discriminating means for discriminating state of loading said photographic material into the camera; and (B) means for actuating said protecting means in response to a state that said loading discriminating means has discriminated the loading of said photographic material into the camera and at the same time said convolution discriminating means has discriminated that said photographic material has not been wound on said spool.

27. A photographic optical system protecting device for a camera comprising:

(A) operating means for displacing said photographing optical system to any desired position; and (B) control means for moving a portion of the photographic optical system exposed within the camera away from a photographic material loading cover or said photographic material prior to an action by said operating means in response to an opening of said photographic material loading cover or to a state in which said photographic material has not been set at a prescribed photographic preparation completion state.

28. A device according to claim 27, wherein said photographic optical system includes a collapsible barrel optical system.

29. A device according to claim 27, wherein said photographic optical system includes a changeable magnification optical system.

30. A device according to claim 27, wherein said control means includes convolution discriminating means for discriminating whether said photographic material has been set at said prescribed photographic preparation completion state or not by discriminating a state of said photographic material being wound on a spool.

31. A device according to claim 30, wherein said control means further includes:

(A) loading discriminating means for discriminating a state of loading of said photographic material into the camera; and (B) means for moving said portion of the photographic optical system exposed within the camera away from said cover or from said photographic material prior to an action by said operating means in response to a state that said loading discriminating means has discriminated the loading of the photographic material into the camera and, at the same time, said convolution discriminating means has discriminated that said photographic material has not been wound on the spool.

32. A photographic optical system protecting device for a camera comprising:

(A) protecting means for protecting a portion of the optical system of the camera exposed within the camera; and (B) contorl means for actuating said protecting means in response to an opening of a cover for loading photographic material or to a state that said photographic material may scratch said portion of the optical system exposed within the camera.

33. A device according to claim 32, wherein said protecting means includes cover means to covering said portion of the optical system exposed within the camera so that said portion of the photographic optical system exposed within the camera is protected.

34. A device according to claim 32, wherein said protecting means includes driving means for moving said portion of the optical system exposed within the camera away from said cover of photographic material so that said portion of the photographic optical system exposed within the camera is protected.

35. A device according to claim 32, wherein said control means includes convolution discriminating means for discriminating a state of said photographic material being wound on a spool.

36. A device according to claim 35, wherein said control means further includes:
(A) loading discriminating means for discriminating state of loading of said photographic material into the camera; and
(B) means for actuating said protecting means in response to a state that said loading discriminating means has discriminated the loading of said photographic material into the camera and at the same time said convolution discriminating means has discriminated that said photographic material has not been wound on said spool.

* * * * *